Oct. 17, 1950           A. BENSON           2,526,193
APPARATUS FOR MAKING COOKIES AND THE LIKE
Filed Feb. 9, 1946
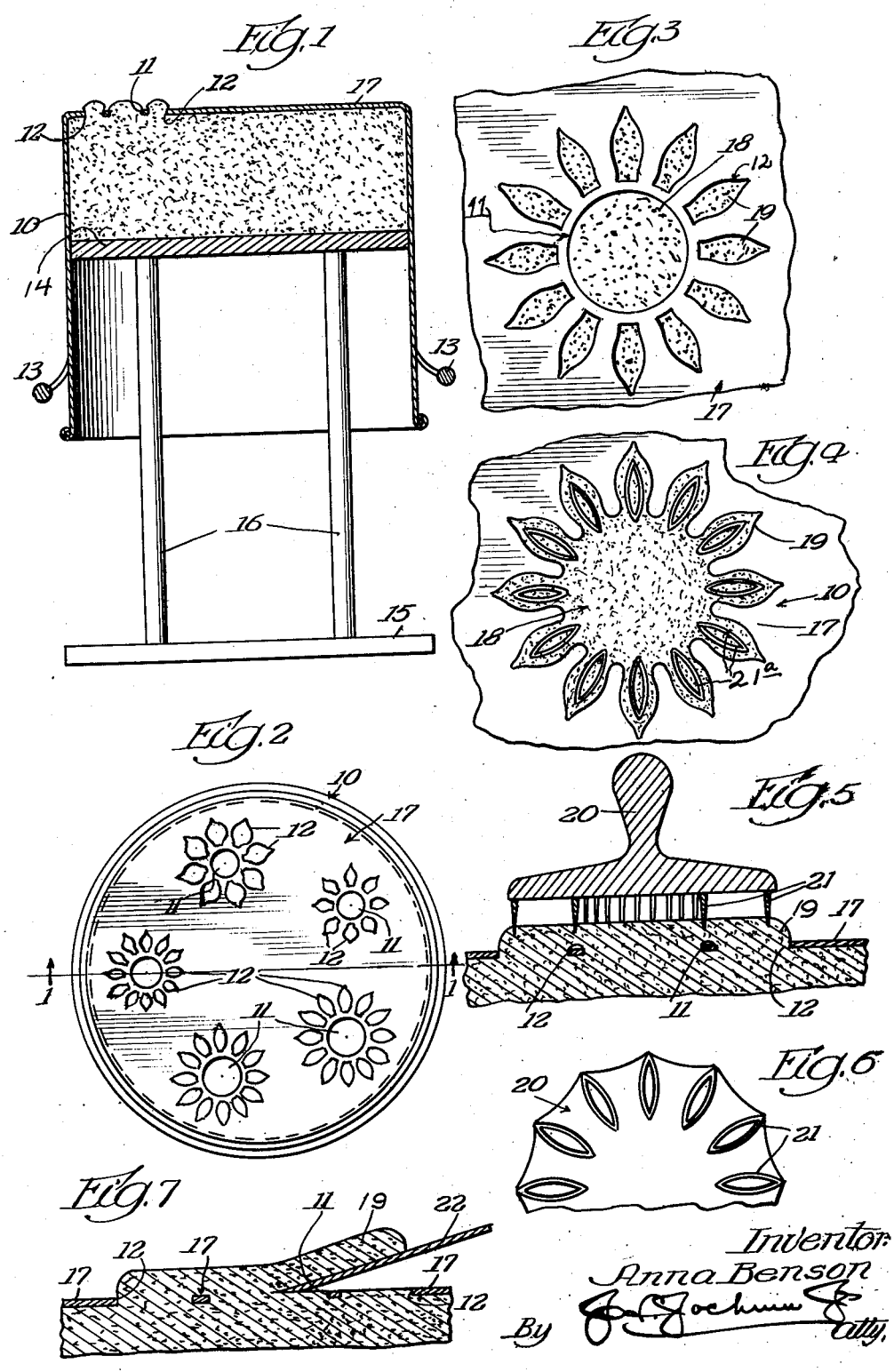

Patented Oct. 17, 1950

2,526,193

UNITED STATES PATENT OFFICE 2,526,193

APPARATUS FOR MAKING COOKIES AND THE LIKE

Anna Benson, Chicago, Ill.

Application February 9, 1946, Serial No. 646,565

1 Claim. (Cl. 107—47)

This invention relates to apparatus for making cookies and the like, and one of the objects of the same is to provide improved means and method for imparting to the cookie a predetermined shape, preferably that of a flower, of the type embodying a disc-like center encompassed by petals, all united to form a substantially flat article.

Another object is to provide improved means of forming or shaping the body portion and petals separate from each other, and then uniting them into a solid or integral structure.

A further object is to provide improved means for ornamenting the cookie so as to represent veins or lines along the petals, whereby the configuration of the finished product will bear a close resemblance to the flower which it represents.

A still further object is to provide an improved apparatus of this character, which will be simple, durable, cheap and sanitary in construction, and effective and efficient in operation.

To the attainment of these ends and the accomplishment of other new and useful objects as will appear, the invention consists in the features of novelty in substantially the construction, combination and arrangement of the several parts of the apparatus, hereinafter more fully described and claimed, taken in connection with the accompanying drawing, in which Fig. 1 is a sectional view, taken on line 1—1, Fig. 2, of a device of this character, embodying my invention.

Fig. 2 is a top plan view of Fig. 1.

Fig. 3 is a plan view on an enlarged scale, showing the formation of the different parts of the cookie, in disconnected relation.

Fig. 4 is a view similar to Fig. 3, showing the parts of the cookie connected together into a completed cookie.

Fig. 5 is a sectional view showing the manner of ornamenting the face of the cookie before it is received from the top of the shaping apparatus.

Fig. 6 is a detail bottom plan view of the lower face of the ornamenting tool.

Fig. 7 is a detail sectional view showing the manner of removing the formed cookie from the top of the forming apparatus.

The apparatus consists essentially of an open receptacle or container 10 provided with a plurality of openings or apertures 11 therethrough, each encompassed by a plurality of apertures 12, the openings 11 being preferably round, while the openings 12 are preferably elongated or of a substantially elliptical shape.

The openings of each series co-operate to preferably produce a configuration in representation of a flower, such as a daisy, aster or the like, the opening 11 forming the body or center of the flower, while the openings 12 form the encompassing petals. During the first stage of the method of forming the flower, the body and petals are formed in assembled relation, but separate and detached from each other, as will be later described.

The receptacle 10 may be of any desired size and configuration, and constructed of any suitable material, and is provided with suitable handles 13.

A plunger member 14 is supported upon a suitable base 15, in any suitable manner, preferably by means of uprights 16, to hold the plunger stationary with respect to the supporting base 15. This plunger is of a size and configuration to fit within the container 10.

In operation, the dough or material from which the product is to be made, is placed within the container, after which the container is inverted and placed over the plunger 14, with the material between the plunger and the bottom 17 of the container. The container is then forced down over the plunger, preferably by means of the handles 13, until sufficient material has been forced through the openings 11 and 12, according to the thickness it is desired to give to the cookie or product.

As the openings 11 and 12 of the respective articles are separate from each other, the material will be forced therethrough into separate and independent quantities, as shown more clearly in Fig. 3 of the drawing, at 18—19. When the desired quantity of material is projected above the bottom 17, the separated particles of the material may be united into a solid or integral mass, by pressing upon the center portion 18 with the finger, or any suitable implement, to cause the center to spread sufficiently so as to unite with the proximate ends of the adjacent petals or portions 19. The formed product may then be removed from the top of the bottom 17 of the container, by means of any suitable blade, tool or spatula 22, for the purpose of cooking the same, if the product is of the type that requires cooking.

If desired, and in order to ornament the product so as to represent veins, or to produce lines in the petal portions of the flower, a suitable tool or implement having a handle 20 and a body portion formed of sections or parts 21 of any desired configuration, may be used, the body of which is suitably shaped and forced into the petal portion of the product a sufficient distance to produce the desired result, and without unduly distorting or mashing the portion which it engages.

Obviously, any desired design or pattern may be formed by the openings 11—12 in the bottom of the container, and any other suitable means may be employed for ornamenting the product, either before or after it is removed from the top of the bottom 17 of the container 10. Also, any desired number of groups or any number of openings may be provided, and arranged to form any desired pattern.

While the preferred form of apparatus has been herein described, it is to be understood that various changes may be made in the apparatus for carrying this invention into operation, within the scope of the claim, without departing from the spirit of this invention.

What is claimed as new is:

An apparatus for making cookies comprising a cookie dough receptacle for receiving a predetermined quantity of cookie dough, a stationary plunger over which the receptacle is adapted to be inverted and snugly received by said plunger, the bottom of the receptacle being provided with a plurality of spaced configurated openings therein, whereby the dough in the receptacle will be exuded through said openings when the receptacle is inverted over and pressed against the plunger, a base for the plunger, and legs fixed to the plunger to support the plunger a distance above the base at least as great as the depth of the receptacle.

ANNA BENSON.

REFERENCES CITED

The following references are of record in the file of this patent:

UNITED STATES PATENTS

| Number | Name | Date |
|---|---|---|
| 512,080 | Winter | Jan. 2, 1894 |
| 573,432 | Megson | Dec. 15, 1896 |
| 1,603,694 | Hill | Oct. 19, 1926 |
| 1,713,585 | Wolf | May 21, 1929 |
| 2,029,684 | Tanzi | Feb. 4, 1936 |
| 2,052,510 | Woolverton | Aug. 25, 1936 |
| 2,055,868 | Larsen | Sept. 29, 1936 |
| 2,169,485 | Bucher | Aug. 15, 1939 |
| 2,217,135 | Parrish, Jr., et al. | Oct. 8, 1940 |
| 2,234,432 | Gallo | Mar. 11, 1941 |